Figures 1, 2, 3:
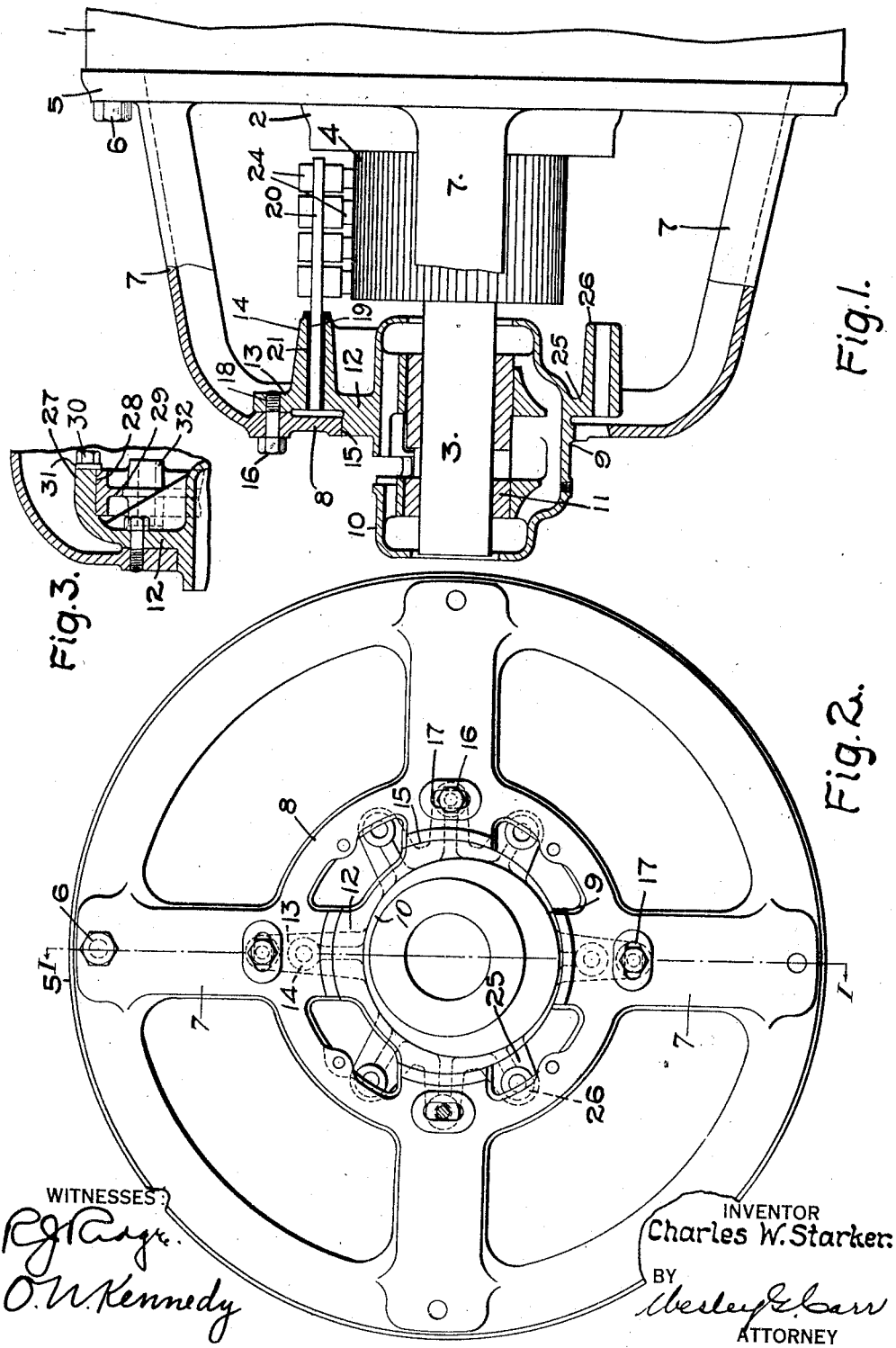

C. W. STARKER.
BEARING HOUSING.
APPLICATION FILED MAY 8, 1916.

1,317,233.

Patented Sept. 30, 1919.

WITNESSES
R. J. Cadye.
O. U. Kennedy

INVENTOR
Charles W. Starker.
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

BEARING-HOUSING.

1,317,233.  Specification of Letters Patent.  Patented Sept. 30, 1919.

Application filed May 8, 1916. Serial No. 96,045.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Bearing-Housings, of which the following is a specification.

My invention relates to bearing housings for dynamo-electric machines, and it has for its object to provide a bearing housing capable of performing the double function of rotatably supporting the armature shaft of the machine and of rigidly supporting current-collecting devices that are adapted to coact with the current-delivering surface of the machine.

Dynamo-electric machines, as heretofore constructed, have usually been provided with end-members that were adapted to be secured to the frame of the machine. Such end-members have usually comprised centrally located bearing housings for rotatably supporting the armature shaft and lugs or projections for rigidly supporting current-collecting devices. As the above-described parts of each end member were formed as a single casting, any errors that were made in machining the bearing housings and supporting lugs resulted in discarding the entire end member. Furthermore, such castings were relatively complicated and expensive to produce.

According to the present invention, I provide a bearing housing that is cast separate from the end-member and is provided with projections respectively having portions adapted to be secured to the end member and other portions adapted to support the current-collecting devices of the accompanying dynamo-electric machine.

In the accompanying drawings, Figure 1 is a view, partially in section and partially in side elevation, of a portion of a dynamo-electric machine provided with a bearing housing constructed in accordance with my invention; Fig. 2 is a front view of a bearing housing and its associated end bracket, and Fig. 3 is a fragmentary sectional view showing a modification in the construction of the bearing housing.

A dynamo-electric machine comprises a frame 1 within which is located an armature member 2 that is mounted on a shaft 3. The armature member 2 embodies a current-delivering surface 4 which is shown as a commutator cylinder, although it is to be understood that the armature member 2 may as well be provided with collector rings. An end bracket 5 is secured to the frame 1 by means of bolts 6 and comprises a plurality of arms 7 that converge toward the shaft 3 and support an annular portion 8 in concentric relation thereto. A bearing housing 9 comprises a hollow cylindrical portion 10 that is provided with a sleeve 11 of suitable bearing material for rotatably supporting the shaft 3. The portion 10 is provided with a plurality of spaced projections 12 which respectively comprise a radial portion 13 and a portion 14 that projects inwardly in parallel relation to the machine axis. The portions 13 are provided with seats 15 that are adapted to receive the annular portion 8. The bearing housing 9, as a whole, is suitably positioned with respect to the shaft 3 and the end bracket 5 by means of bolts 16 coacting with elongated slots 17 and threaded openings 18 provided in the annular portion 8 and the portions 13, respectively. Each portion 14 is provided with a central opening 19 within which is located a rod 20. The rod 20 is surrounded by a sleeve 21 of insulating material that is pressed into the opening 19. A plurality of current-collecting devices 24, such as brush holders, are mounted on the rod 20 and are adapted to coact with the current-delivering surface 4. The bearing housing 9 is further provided with other projections 25 intermediate the projections 12 that comprise portions 26 that are similar in form and perform the same functions as the portions 14.

A modification of the bearing housing 9 is shown in Fig. 3 wherein the projections 12 are provided with inwardly projecting portions 27 that are respectively provided with seats 28. A rocker ring 29 is adapted to fit within the seats 28 and is secured therein by means of bolts 30 and washers 31 coacting with the portions 27. The rocker ring 29 is provided with spaced lugs 32 that are adapted to provide means for carrying the current-collecting devices, as described with reference to Fig. 1.

It is apparent that a bearing housing constructed in accordance with my invention may be applied to any form of end-bracket or even to suitable arms extending from the frame of the dynamo-electric machine. Furthermore, by having the bearing housing and the means for supporting the current-collecting devices detachable from the end-bracket, greater adjustment thereof with respect to the shaft and current-delivering surfaces may be secured than with the previous integral construction.

In the following claims, the term "end bracket" is used to designate a member which serves to support the bearing and to protect the armature and field winding. This term is used to mean either a closed-in end bell or merely radial arms connecting the frame and the bearing.

While I have shown my invention in simple and preferred forms, it is not so limited but is susceptible of such various minor changes and modifications as come within the scope of the appended claims.

I claim as my invention:

1. In a dynamo-electric machine, the combination with a frame provided with an end bracket, an armature having a shaft and embodying a current-transferring surface located within said end bracket, of sets of brushes to coact with said current-transferring surface and a bearing member comprising a cylindrical portion for rotatably supporting said shaft and secured to said end bracket and having integral projections for supporting said sets of brushes.

2. In a dynamo-electric machine, the combination with a frame, an armature provided with a current-transferring surface and located within said frame, and an end bracket secured to said frame, of sets of brushes to coact with said current-transferring surface and a bearing member comprising a cylindrical portion for rotatably supporting said armature shaft and attached to said end bracket and having integral portions, parallel to said armature axis, for supporting the brushes.

3. In a dynamo-electric machine, the combination with a bearing including a bearing housing, an armature provided with a current-transferring device and a shaft arranged to rotate within said bearing, of elongated tapering boss members integral with said bearing housing and hollow throughout the major portion of their length, and supporting members for sets of brushes firmly held in said hollow boss members, said sets of brushes bearing on said current-transferring device.

4. In a dynamo-electric machine, the combination with a frame, a bearing including a bearing housing, an armature provided with a current-transferring device located within said frame and an end bracket secured to said frame, of elongated tapering boss members integral with said bearing housing and parallel to said armature shaft and having relatively deep openings therein, and a supporting member for a set of brushes firmly held in each of said openings but insulated from the wall thereof, said sets of brushes bearing on said current-transferring device.

In testimony whereof, I have hereunto subscribed my name this 29th day of April 1916.

CHARLES W. STARKER.

Copies of this patent may be obtained for five cents each, by addressing the "Commissioner of Patents, Washington, D. C."